United States Patent
Shalaby

(10) Patent No.: US 11,020,763 B2
(45) Date of Patent: Jun. 1, 2021

(54) SPACER FLOW GUIDE FOR PARTITIONING BUILD CHAMBER OF AN ADDITIVE MANUFACTURING SYSTEM

(71) Applicant: General Electric Company, Schenectady, NY (US)

(72) Inventor: Mohammed Mounir Shalaby, Schenectady, NY (US)

(73) Assignee: General Electric Company, Schnectady, NY (US)

( * ) Notice: Subject to any disclaimer, the term of this patent is extended or adjusted under 35 U.S.C. 154(b) by 256 days.

(21) Appl. No.: 16/107,723

(22) Filed: Aug. 21, 2018

(65) Prior Publication Data

US 2020/0061656 A1 Feb. 27, 2020

(51) Int. Cl.
*B29C 67/00* (2017.01)
*B05B 12/32* (2018.01)
*B29C 64/153* (2017.01)
*B29C 64/245* (2017.01)
*B29C 64/371* (2017.01)
(Continued)

(52) U.S. Cl.
CPC .............. *B05B 12/32* (2018.02); *B05B 7/08* (2013.01); *B05B 12/006* (2013.01); *B05B 12/087* (2013.01); *B22F 10/00* (2021.01); *B29C 64/153* (2017.08); *B29C 64/245* (2017.08); *B29C 64/371* (2017.08); *B22F 2201/11* (2013.01); *B33Y 10/00* (2014.12); *B33Y 30/00* (2014.12); *B33Y 40/00* (2014.12)

(58) Field of Classification Search
CPC ... B29C 64/153; B29C 64/245; B29C 64/371; B33Y 10/00; B33Y 30/00; B33Y 50/00; B33Y 50/02
See application file for complete search history.

(56) References Cited

U.S. PATENT DOCUMENTS

2016/0059310 A1 3/2016 Junker et al.
2017/0120330 A1 5/2017 Sutcliffe et al.
(Continued)

FOREIGN PATENT DOCUMENTS

WO 2017208553 A1 12/2017

OTHER PUBLICATIONS

Ferrar, B., et al.; "Gas flow effects on selective laser melting (SLM) manufacturing performance," Journal of Materials Processing Technology, vol. 212, Issue: 2, pp. 355-364, Feb. 2012.
(Continued)

*Primary Examiner* — Ryan M Ochylski
(74) *Attorney, Agent, or Firm* — Dority & Manning, P.A.

(57) ABSTRACT

The present disclosure relates to the manufacture and use of an additive manufacturing (AM) system that employs a spacer flow guide disposed or formed within a housing that defines a chamber of the AM system. The spacer flow guide may direct various portions of a gas flow within the chamber to respective exhaust channels. For example, in combination with portions of the housing, the spacer flow guide may define a main exhaust channel that extends between the chamber and a gas outlet formed in a downstream end of the housing. Additionally, a bypass exhaust channel may be defined between the chamber and a back surface of the spacer flow guide to fluidly couple an upper portion of the chamber to the main exhaust channel.

20 Claims, 8 Drawing Sheets

(51) Int. Cl.
  *B05B 7/08*    (2006.01)
  *B05B 12/00*   (2018.01)
  *B05B 12/08*   (2006.01)
  *B22F 10/00*   (2021.01)
  *B33Y 10/00*   (2015.01)
  *B33Y 30/00*   (2015.01)
  *B33Y 40/00*   (2020.01)

(56)           References Cited

U.S. PATENT DOCUMENTS

| | | |
|---|---|---|
| 2017/0120536 A1 | 5/2017 | Brunermer et al. |
| 2017/0144223 A1 | 5/2017 | Gold et al. |
| 2017/0291358 A1 | 10/2017 | Donovan |
| 2018/0043432 A1* | 2/2018 | Domrose .............. B29C 64/153 |
| 2018/0126650 A1 | 5/2018 | Murphree et al. |

OTHER PUBLICATIONS

Philo, A.M., et al.; "A Study Into the Effects of Gas Flow Inlet Design of the Renishaw Am250 Laser Powder Bed Fusion Machine Using Computational Modelling," 2017: Proceedings of the 28th Annual International Solid Freeform Fabrication Symposium, pp. 1-18, Dec. 2017.

\* cited by examiner

SPACER FLOW GUIDE FOR PARTITIONING BUILD CHAMBER OF AN ADDITIVE MANUFACTURING SYSTEM

BACKGROUND

The subject matter disclosed herein generally relates to an additive manufacturing system, and more specifically, to a Direct Laser Sintering (DLS) or Direct Laser Melting (DLM) system that employs focused energy to selectively fuse a powder material to produce an object.

Additive manufacturing (AM) processes generally involve the buildup of one or more materials to make a net or near-net shape object, in contrast to subtractive manufacturing methods, which selectively remove material from an initial form to fabricate an object. Though "additive manufacturing" is an industry standard term (ASTM F2792), it encompasses various manufacturing and prototyping techniques known under a variety of names, including freeform fabrication, 3D printing, and rapid prototyping/tooling. A particular type of AM process uses a focused energy source (e.g., an electron beam, a laser beam) to sinter or melt a powder material deposited on a build platform within a chamber, creating a solid three-dimensional object in which particles of the powder material are bonded together.

Laser sintering/melting, as used in Direct Laser Sintering (DLS) and/or Direct Laser Melting (DLM), is a common industry term used to refer to a method of producing three-dimensional (3D) objects by using an energy beam to sinter or melt a fine powder. In particular, laser sintering/melting techniques often entail selectively directing a laser beam onto a controlled amount of powder (e.g., a powder bed) on a substrate, so as to form a layer of fused particles or molten material thereon. When the laser beam interacts with the powder bed, smoke and/or a particulate matter (e.g., condensate, spatter) is produced within the chamber. The smoke and/or the particular matter may be detrimental to the quality of the resulting object. As an example, the suspended smoke and/or particulate matter within the chamber can interfere with the laser beam and reduce the energy or intensity of the laser beam before it reaches the powder bed. As another example, the smoke and/or the particulate matter may deposit onto the powder bed and may become incorporated into the resulting object.

In certain laser sintering/melting (or DLS/DLM) systems, a gas flow is introduced into the chamber to flow along the build platform in an effort to remove the smoke and/or particulate matter and prevent deposition. However, because a volume of the chamber may be large to accommodate the components of the DLS/DLM system, a gas flow volume sufficient to remove smoke and/or particulate matter from the chamber may be significantly large. As such, replacing the gas flow or reconditioning the gas flow downstream of the chamber to remove the smoke and/or particulate matter from the gas flow before the gas flow is returned to the chamber may be a costly process. Accordingly, replacing or reconditioning the gas flow directed through a large-volume manufacturing chamber increases operating costs and/or material costs of DLS/DLM systems.

BRIEF DESCRIPTION

In one embodiment, an additive manufacturing (AM) system includes a housing defining a chamber. A lower portion of the chamber includes a build platform disposed therein that is configured to receive a powder material. The AM system includes a gas inlet system coupled to a first side wall of the housing and configured to direct one or more gas flows through the chamber. The AM system includes a gas outlet defined in a second side wall of the housing, disposed opposite the first side wall. The gas outlet is configured to discharge the one or more gas flows from the chamber. The AM system also includes a spacer flow guide disposed within the chamber and configured to direct the one or more gas flows around the spacer flow guide. The AM system includes a main exhaust channel defined between a first surface of the spacer flow guide and the housing. The main exhaust channel is configured to direct a first portion of the one or more gas flows from the lower portion of the chamber into the gas outlet. The AM system additionally includes a bypass exhaust channel defined between a second surface of the spacer flow guide and the housing. The bypass exhaust channel is configured to direct a second portion of the one or more gas flows from an upper portion of the chamber to combine the first portion and the second portion of the one or more gas flows upstream of the gas outlet.

In another embodiment, a method of operating an additive manufacturing (AM) system includes depositing a bed of a powder material on a build platform positioned within a lower portion of a chamber defined by a housing. The method includes supplying one or more gas flows into the chamber. The method includes directing a first portion of the one or more gas flows along a main exhaust channel defined between the housing and a lower surface of a spacer flow guide disposed within the chamber. The main exhaust channel fluidly couples the lower portion of the chamber to a gas outlet. The method includes directing a second portion of the one or more gas flows along a bypass exhaust channel defined between the housing and an upper surface of the spacer flow guide. The bypass exhaust channel fluidly couples an upper portion of the chamber to the main exhaust channel.

In a further embodiment, an additive manufacturing (AM) system includes a housing defining a chamber. The chamber is configured to receive one or more gas flows therein. The AM system includes a build platform disposed within a lower portion of the chamber and configured to receive a bed of powder material. The AM system includes a gas outlet defined in a first side wall of the housing. The gas outlet is configured to discharge the one or more gas flows from the chamber. The AM system also includes a spacer flow guide configured to direct a first portion of the one or more gas flows below the spacer flow guide and configured to direct a second portion of the one or more gas flows above the spacer flow guide. The AM system includes a main exhaust channel defined between a lower surface of the spacer flow guide and the housing. The main exhaust channel is configured to direct the first portion of the one or more gas flows into the gas outlet. Additionally, the AM system includes a bypass exhaust channel defined between an upper surface of the spacer flow guide and the housing. The bypass exhaust channel is configured to introduce the second portion of the one or more gas flows into the first portion of the one or more gas flows at an injection point positioned along a length of the main exhaust channel upstream of the gas outlet.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
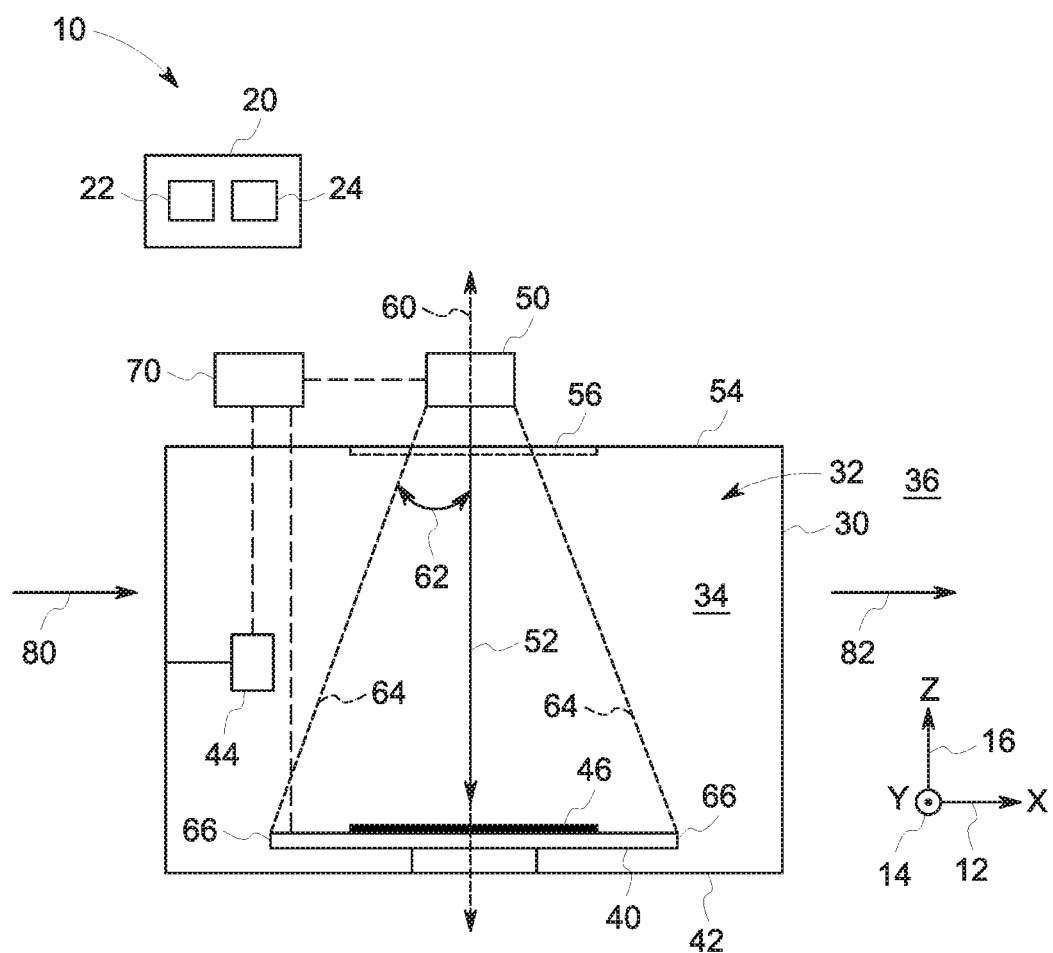
FIG. 1 is a schematic diagram of an embodiment of an additive manufacturing (AM) system having a manufacturing chamber, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. The term "uniform gas flow", as used herein, means that the flow velocity of a gas flow does not significantly vary across a width and/or a length of a path of the gas flow, such that the flow velocity is within ±10%, ±5%, or ±1% of the flow velocity at another location. As used herein, the term "additive manufacturing", or "AM", relates to any suitable laser or e-beam sintering/melting additive manufacturing technique, including, but not limited to: Direct Metal Laser Melting, Direct Metal Laser Sintering, Direct Metal Laser Deposition, Laser Engineered Net Shaping, Selective Laser Sintering, Selective Laser Melting, Selective Heat Sintering, Fused Deposition Modeling, Hybrid Systems, or combinations thereof.

The present disclosure generally encompasses systems and methods for fabricating objects using a laser sintering/melting-based method of additive manufacturing. As mentioned, for such additive manufacturing techniques, when the laser beam sinters or melts the powder bed within an enclosed manufacturing chamber, smoke and/or particulate matter (e.g., condensate, spatter), collectively referred to herein as "particulates," can accumulate or buildup within the chamber. To effectively remove these particulates that may interfere with the fabrication process, a significate flow rate (e.g., mass flow rate, volume flow rate) of a gas flow may be directed through the chamber. As such, it may be desirable to partition the chamber to reduce a volume of the chamber to a smaller gas volume, without affecting an efficiency of the manufacturing process. Moreover, the present techniques provide additional flow paths between otherwise stagnant portions of the chamber and a gas outlet to enable a lower gas flow rate to be utilized during operation.

As discussed in detail below, some embodiments of the present disclosure include an additive manufacturing (AM) system that employs a spacer flow guide disposed or formed within a housing that defines the chamber of the AM system. The spacer flow guide is generally a blockage or baffle that is fitted within the chamber to direct various portions of the gas flow therein to respective exhaust channels. For example, in combination with portions of the housing, the spacer flow guide defines a main exhaust channel that extends between a build platform within the chamber and a gas outlet formed in a downstream end of the housing. Additionally, a bypass exhaust channel is defined between the housing and a back surface of the spacer flow guide to fluidly couple an upper portion of the chamber to the main exhaust channel. As discussed, the bypass exhaust channel may include physical features (e.g., a tapered neck, additional interconnect channels that extend between the chamber and the bypass exhaust channel) to further facilitate removal of a portion of the gas flow from the upper portion of the chamber that may recirculate within the chamber. Accordingly, the addition of the spacer flow guide may advantageously reduce a gas volume of the chamber and/or reduce recirculation of particulates inside the chamber to enable the AM system to use a reduced gas flow rate for the fabrication process. These and other features will be described below with reference to the drawings.

FIG. 1 illustrates an example embodiment of an AM system 10 (e.g., a laser sintering/melting AM system 10) for producing an article or object using a focused energy source or beam. To facilitate discussion, the AM system 10 and its components will be described with reference to an x-axis or direction 12, a y-axis or direction 14, and a z-axis or direction 16. In the illustrated embodiment, the AM system 10 includes a controller 20 having memory circuitry 22 that stores instructions (e.g., software, applications), as well as processing circuitry 24 programmed or designed to execute these instructions to control various components of the AM system 10. The AM system 10 includes a housing 30 defining a manufacturing chamber 32 (also referred to herein as chamber 32) that defines an interior volume 34. The chamber 32 is sealed to contain an inert atmosphere and to protect the build process from an ambient atmosphere 36 outside of the housing 30. The AM system 10 includes a build platform 40 disposed inside the chamber 32 on a base portion or bottom wall 42 of the housing 30. In some embodiments, the build platform 40 may have a working area (e.g., the top surface of the build platform 40) in a range between about 0.01 square meters ($m^2$) and about 1.5 $m^2$. The article or object of the AM process is fabricated on the build platform 40, as discussed below.

The AM system 10 includes a powder application device 44, which may be arranged inside the chamber 32 to deposit a quantity (e.g., a layer or bed) of a powder material onto the build platform 40. The powder material deposited on the build platform 40 generally forms a powder bed 46. The powder material may include, but is not limited to, polymers, plastics, metals, ceramics, sand, glass, waxes, fibers, biological matter, composites, or hybrids of these materials. These materials may be used in a variety of forms as appropriate for a given material and method, including, for example, solids, powders, sheets, foils, tapes, filaments, pellets, wires, atomized, and combinations of these forms.

The AM system 10 also includes an energy generating system 50, which may be arranged inside or outside of the chamber 32 for generating and selectively directing a focused energy beam 52, such as a laser beam, onto at least a portion of the powder bed 46 disposed on the build platform 40. For the embodiment illustrated in FIG. 1, the energy generating system 50 is arranged in proximity to a top portion or top wall 54 of the housing 30, opposite to the base portion or the bottom wall 42. For the illustrated embodiment, the focused energy beam 52 enters the chamber 32 through a window or laser window 56 disposed within the top wall 54. The focused energy beam 52 is directed onto the build platform 40 at any suitable angle relative to a vertical axis 60 extending along the z-axis 16 between the energy generating system 50 and the build platform 40, such as an angle ranging from 0 degrees (°) relative to the vertical axis 60 to a beam angle 62, such as 20°, 25°, 30°, 35°, 40°, 45°, 50°, or so forth, defined between the vertical axis 60 and a maximum offset axis 64 extending between the energy generating system 50 and an edge 66 of the build platform 40. The powder bed 46 disposed on the build platform 40 is therefore selectively subjected to the focused energy beam 52 at any suitable angle in a selective manner as controlled by the controller 20, depending on the desired geometry of the article. In some embodiments, the energy generating system 50 includes a focused energy source for generating the focused energy beam 52. In some embodiments, the focused energy source includes a laser source and the focused energy beam 52 is a laser beam. In some embodiments, the laser source includes a pulsed laser source that generates a pulsed laser beam. The pulsed laser beam is not emitted continuously, in contrast with a continuous laser radiation, but is emitted in a pulsed manner, such as in limited-duration pulses spaced at time intervals. In some embodiments, the energy generating system 50 includes multiple focused energy sources that each selectively irradiate the powder bed 46 using the focused energy beam 52.

The AM system 10 includes a positioning system 70 (e.g., a gantry or other suitable positioning system), which may be arranged inside the chamber 32. The positioning system 70 may be any multidimensional positioning system, such as a delta robot, cable robot, robot arm, or another suitable positioning system. The positioning system 70 may be operatively coupled to the powder application device 44, the energy generating system 50, the build platform 40, or a combination thereof. The positioning system 70 may move the powder application device 44, the energy generating system 50, the build platform 40, or a combination thereof, relatively to one another, in any of the x-, y-, and z-directions 12, 14, 16, or a combination thereof.

As will be discussed in more detail in FIG. 2, the AM system 10 is further designed to supply an inlet gas flow 80 (e.g., a total gas flow, a single gas flow, both an upper and a lower gas flow) into the chamber 32 and to discharge an exhaust gas flow 82 from the chamber 32. For example, for embodiments of the AM system 10 in which the inlet gas flow 80 includes an upper gas flow and a lower gas flow provided into the chamber 32, the exhaust gas flow 82 being discharged from the chamber 32 includes the upper gas flow, the lower gas flow, as well as a substantial portion of any particulates that are generated on application of the focused energy beam 52 to selectively melt or sinter the powder bed 46 during formation of a desired article.

The chamber 32 is formed with a sufficient size to enable the multiple components disposed within and/or coupled to the chamber 32 to operate in concert to form the desired article. The components may therefore utilize a significant portion of the interior volume 34 of the chamber 32, and the aforementioned gas flows are provided at a sufficient flow rate to remove the particulates from the chamber 32. As discussed below, to cordon or block off unused portions of the chamber 32 and reduce a gas volume of the chamber 32 without interfering with the manufacturing process, the AM system 10 also includes a spacer flow guide disposed within the housing 30. The spacer flow guide may selectively direct a first portion or main portion of the inlet gas flow 80 within the chamber 32 to the gas outlet and direct a second portion or an auxiliary portion of the inlet gas flow 80 from another portion of the chamber 32 to join the main portion. By restricting gas flow through a portion of the chamber 32 that is not occupied by the other components of the AM system 10, the spacer flow guide enables a significant reduction in a working volume of the chamber 32. Moreover, the reduced working volume is associated with substantially reduced gas flow requirements and costs associated with recycling or otherwise replacing the gas flows within the AM system 10.

Figure 2:
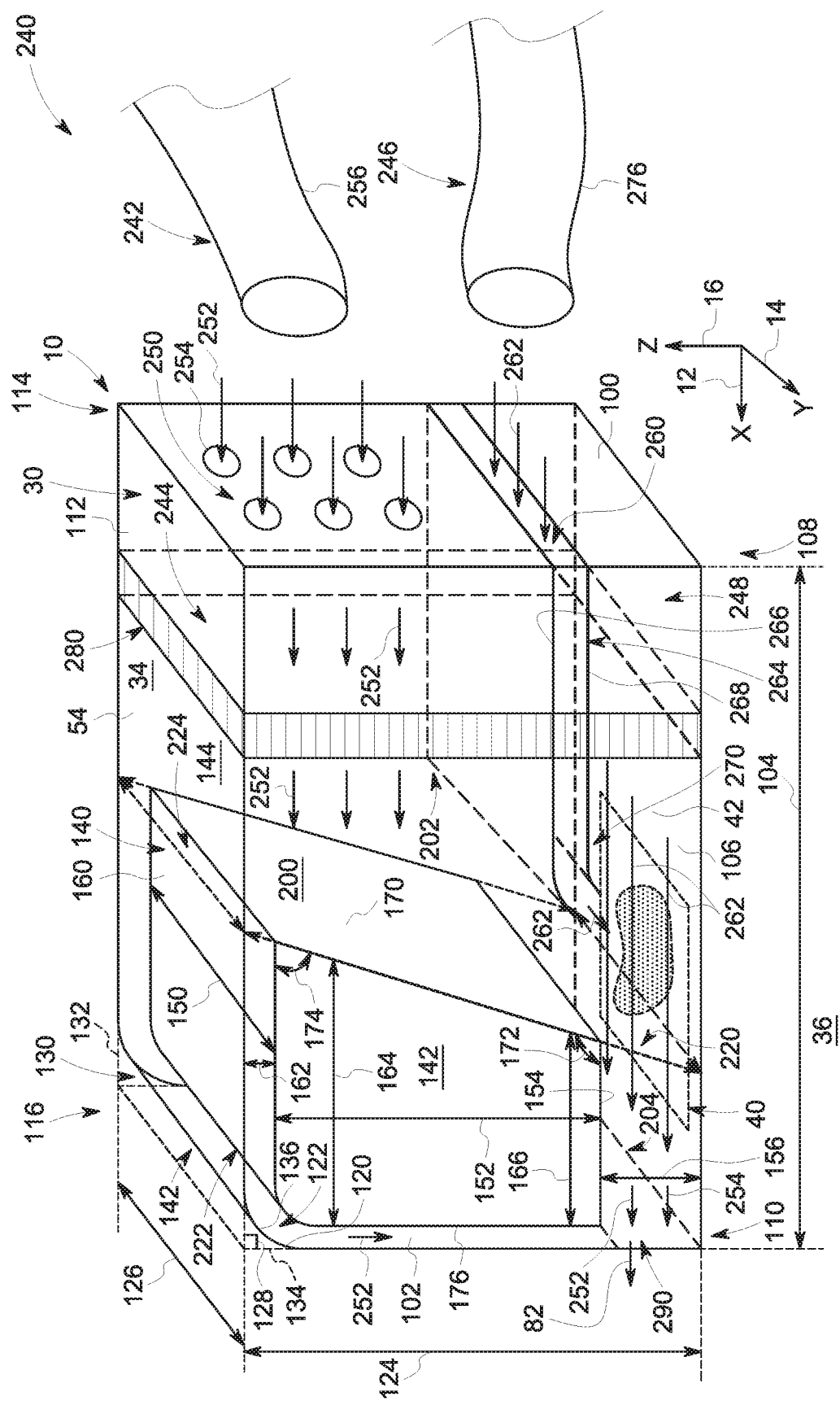
FIG. 2 is a schematic perspective view illustrating an embodiment of the manufacturing chamber of the AM system of FIG. 1 including a spacer flow guide disposed therein, in accordance with present embodiments.

FIG. 2 is a schematic perspective view illustrating an embodiment of the chamber 32 of the AM system 10, in accordance with present embodiments. As illustrated, to enclose the interior volume 34 of the chamber 32, the housing 30 of the present embodiment includes a front wall 100 spaced from a rear wall 102 by a chamber length 104 defined along the x-axis 12. Additionally, a first side wall 106 of the housing 30 extends between a first edge 108 of the front wall 100 and a first edge 110 of the rear wall 102, and a second side wall 112 of the housing 30 extends between a second edge 114 of the front wall 100 and a second edge 116 of the rear wall 102. The bottom wall 42 of the housing 30 encloses a bottom surface of the chamber 32. Moreover, in the present embodiment, the top wall 54 of the housing 30 extends primarily along the x-axis 12 and curves downward to extend along the z-axis 16, such that a curved elbow portion 120 of the housing 30 is formed within an upper rear portion 122 of the chamber 32.

Accordingly, a chamber height 124 is defined between the top wall 54 and the bottom wall 42 along the z-axis 16, and a chamber width 126 is defined between the side walls 106, 112 of the housing 30. In some embodiments, the top wall 54 and the rear wall 102 may be formed as a unitary structure, such as a single surface into which a bend is disposed. As discussed in more detail herein, the housing 30 having the curved elbow portion 120 may direct gas flows within the chamber 32 more smoothly or with less turbulence than a similar housing without a curve formed therein, although housings without curved walls may also use the present techniques in some embodiments. Moreover, in some embodiments, the top wall and the rear wall 102 may be disposed at a right angle 128 relative to one another, and the curved elbow portion 120 of the housing 30 may be defined by an auxiliary spacer insert 130 disposed between the top wall 54 and the rear wall 102. In such embodiments, the auxiliary spacer insert 130 includes a first side 132 disposed against the top wall 54, a second side 134 disposed against the rear wall 102, and a concave surface 136 that extends between the sides 132, 134 and defines the curved elbow portion 120. Compared to a housing shaped as a rectangular prism without the auxiliary spacer insert 130 therein, embodiments having the auxiliary spacer insert 130 advantageously restrict gas flow from a portion of the interior volume 34 of the chamber 32.

Additionally, within the chamber 32 defined by the housing 30, the AM system 10 includes a spacer flow guide 140 that directs one or more gas flows in the chamber 32. The spacer flow guide 140 may be any suitable solid or hollow structure formed from any suitable material (e.g., metal, ceramics, polymers). The illustrated embodiment of the spacer flow guide 140 occupies or restricts a portion of the interior volume 34 of the chamber 32, hereinafter referred to as a spacer-occupied volume 142 of the chamber 32. As such, the spacer flow guide 140 separates a gas volume 144 of the chamber 32, through which one or gas flows may move, from the spacer-occupied volume 142. In embodiments having the auxiliary spacer insert 130, the portion of the interior volume 34 of the chamber 32 occupied by the auxiliary spacer insert 130 further contributes to the spacer-occupied volume 142. In the present embodiment, the spacer flow guide 140 has a width 150 that extends along the full chamber width 126 defined between the side walls 106, 112. In some embodiments, the width 150 of the spacer flow guide 140 may alternatively extend along a portion of the chamber width 126 instead of the full chamber width 126, such that gas flows may be selectively directed along the spacer flow guide 140 along a plane defined between the z-axis 16 and the x-axis 12. Moreover, the spacer flow guide 140 has a height 152 that extends along a portion of the chamber height 124. That is, a bottom surface 154 of the spacer flow guide 140 is separated from the bottom wall 42 by a lower separation distance 156 extending along the z-axis 16, and a top surface 160 of the spacer flow guide 140 is separated from the top wall 54 by an upper separation distance 162. Together, the height 152 of the spacer flow guide 140, the lower separation distance 156, and the upper separation distance 162 are equal to the chamber height 124.

Further, for the illustrated embodiment, the spacer flow guide 140 is tapered along the z-axis 16, such that a first length 164 of the spacer flow guide 140 defined along the x-axis 12 (proximate the top surface 160 of the spacer flow guide 140) is larger than a second length 166 of the spacer flow guide 140 defined along the x-axis 12 (proximate the bottom surface 154 of the spacer flow guide 140). As used herein, two elements are described as "proximate" when the elements are at least disposed in close proximity to, or near, one another. In some embodiments, proximate elements may be in direct contact. Accordingly, a front surface 170 of the spacer flow guide 140 is angled in the present embodiment to form an obtuse angle 172 between the front surface 170 and the bottom surface 154 and to form an acute angle 174 between the front surface 170 and the top surface 160. The front surface 170 is disposed opposite a back surface 176 of the spacer flow guide 140, which generally extends parallel to the z-axis 16 in the present embodiment. As recognized herein, any surface of the spacer flow guide 140 may be formed in any suitable shape or orientation, such that the back surface 176 may be angled relative to the z-axis 16, the front surface 170 may be tapered in an opposite direction than illustrated, and so forth, in accordance with the present disclosure.

In certain embodiments, the spacer flow guide 140 may be coupled to the side walls 106, 112 via an interference fit, adhesives, fasteners, or any other suitable attachment process or device for maintaining a position of the spacer flow guide 140 within the chamber 32. However, it is to be understood that the spacer flow guide 140 may additionally or alternatively be supported within the chamber 32 by any suitable element or process, such as a base extending from the bottom wall 42 to support the bottom surface 154 of the spacer flow guide, a hanger or support that suspends the top surface 160 of the spacer flow guide 140 from the top wall 54, and so forth. Moreover, in some embodiments, the spacer flow guide 140 may alternatively be formed by walls of the housing instead of by an insert, such that a "through hole" shaped as the spacer flow guide 140 and bounded by surfaces of the housing 30 is formed between the side walls 106, 112. The through hole may be fluidly coupled to the ambient atmosphere 36 in these embodiments of the AM system 10, which may utilize fewer parts or a simplified construction or assembly process than embodiments in which the spacer flow guide 140 is inserted into the chamber 32.

To facilitate description of the gas flow within the chamber 32, bounds of the spacer flow guide 140 will be used to delineate certain portions of the chamber 32. For example, as presently illustrated, a front surface plane 200 extending in a same plane as the front surface 170 of the spacer flow guide 140 to coincide with the housing 30 is referred to herein as delineating an upstream portion 202 of the chamber 32 from a downstream portion 204 of the chamber 32. Accordingly, by definition and with reference to the front surface plane 200, the spacer flow guide 140 is disposed in the downstream portion 204 of the chamber 32. Moreover, for components of the AM system 10 other than the chamber 32, the terms "upstream" and "downstream" are used with reference to a relative placement of components along a gas flow direction through the chamber 32. As used herein, directional terms, such as above, below, upper, lower, and so forth are intended to reference relative positions of components in an installed position or configuration of the AM system 10. For example, the terms upper and lower are intended to reference a relative placement of components along the z-axis 16 when installed within the AM system 10.

The illustrated spacer flow guide 140 is shaped to direct gas flows within the chamber 32 along one or more desired flow paths defined along channels or conduits within the chamber 32. For example, as illustrated, a main exhaust channel 220 is defined between the bottom surface 154 of the spacer flow guide 140 and the bottom wall 42 of the chamber. Moreover, the top surface 160 of the spacer flow guide 140 extends along the x-axis 12, bends, and extends into the back surface 176 of the spacer flow guide 140. Accordingly, a curved top edge portion 222 of the spacer flow guide 140 generally corresponds (e.g., has a same radius of curvature within 5%) to the curve of the curved elbow portion 120 of the housing 30. As such, a bypass exhaust channel 224 is defined between the top surface 160 and the back surface 176 of the spacer flow guide 140 and the top wall 54 and the rear wall 102 of the housing 30. Although the spacer flow guide 140 is illustrated with sharp edges formed between other surfaces of the spacer flow guide 140 in the present embodiment, it is to be understood that, in other embodiments, any suitable number of the edges of the spacer flow guide 140 may be rounded or otherwise shaped to produce desired aerodynamic effects and/or flow directing effects.

Flow of gas along the channels 220, 224 may be selectively provided and controlled by adjusting components of the AM system 10, as discussed herein. To provide one or more gas flows to the chamber 32 (e.g., as the inlet gas flow 80 of FIG. 1), the AM system 10 includes a gas flow system 240 coupled to the front wall 100 of the housing 30. For example, the illustrated gas flow system 240 includes an upper gas flow system 242 arranged in an upper portion 244 of the chamber 32 and a lower gas flow system 246 arranged in a lower portion 248 of the chamber 32, vertically beneath the upper gas flow system 242 along the z-axis 16. The upper gas flow system 242 may be integrated with and/or coupled to the housing 30. The upper gas flow system 242 includes an upper gas inlet 250 for supplying an upper gas flow 252 to the chamber 32. For the illustrated embodiment, the upper gas inlet 250 includes multiple circular openings 254 defined in the front wall 100 of the housing 30. However, the circular openings 254 may be of any suitable shape, size, or quantity (e.g., including a single opening) that enables substantially uniform or laminar gas flow within the chamber 32. Further, the upper gas inlet 250 may be coupled to an upper gas delivery device 256 that is, in turn, coupled to a gas supply line. The upper gas delivery device 256 may help uniformly supply the upper gas flow 252 through the chamber length 104 of the chamber 32.

The embodiment of the AM system 10 shown in FIG. 2 also includes the lower gas flow system 246 arranged in the lower portion 248 of the chamber 32. The lower gas flow system 246 may be integrated with and/or coupled to the housing 30. Additionally, the lower gas flow system 246 includes a lower gas inlet 260 for supplying a lower gas flow 262 to the chamber 32. For the illustrated embodiment, the lower gas inlet 260 is defined by the dividing walls 264 (e.g., an upper dividing wall 266 and a lower dividing wall 268) extending along the y-axis 14 from the first side wall 106 to the second side wall 112 of the housing 30, through the entire chamber width 126 of the chamber 32. The illustrated dividing walls 264 also extend along the x-axis 12 from the front wall 100, through at least a portion of the chamber length 104 of the chamber 32, toward the rear wall 102 of the housing 30. As used herein, a denotation between the upper and lower portions 244, 248 of the chamber 32 is made based on a vertical position (e.g., along the z-axis 16) of the dividing walls 264. That is, the upper portion 244 of the chamber 32 generally refers to any portion of the chamber 32 disposed above the dividing walls 264, while the lower portion 248 of the chamber 32 refers to any portion of the chamber 32 disposed level with or below the dividing walls 264. As such, the upper portion 244 may include an upper 50%, upper 60%, upper 70%, or upper 80% along the z-axis 16 of the chamber 32, and the lower portion 248 may include a corresponding lower 50%, lower 40%, lower 30%, or a lower 20% along the z-axis 16 of the chamber 32.

The lower gas inlet 260 is arranged such that the lower gas flow 262 is guided between the dividing walls 264 to flow toward the build platform 40. The dividing walls 264 are arranged such that the lower gas flow 262 exits at a lower gas outlet 270 that is in close proximity to the build platform 40. Then, the lower gas flow 262 flows across the build platform 40. The lower gas flow 262 exiting the lower gas inlet 260 flows generally uniformly along a direction that is parallel to the x-axis 12, parallel to a top surface 274 of the build platform 40, and/or perpendicular to the z-axis 16. Furthermore, the lower gas inlet 260 is arranged, such that the presence of the dividing walls 264 does not interfere with movements and operations of the powder application device 44 or other various components of the AM system 10. The lower gas inlet 260 may be coupled to a lower gas delivery device 276 that is in turn, coupled to a gas supply line. The lower gas delivery device 276 may help uniformly supply the lower gas flow 262 through a significant portion of the entire chamber length 104.

For the illustrated embodiment, the AM system 10 also includes a flow conditioning device 280 configured to facilitate regulation of flow characteristics of the upper gas flow 252 and the lower gas flow 262. The flow characteristics of the upper gas flow 252 and the lower gas flow 262 are separately conditioned by the flow conditioning device 280 to desired levels for removing the particulates from the chamber 32. In some embodiments, the flow conditioning device 280 may be omitted.

When traveling through the chamber 32, at least a portion of the upper gas flow 252 and/or the lower gas flow 262 contacts the front surface 170 of the spacer flow guide 140. The front surface 170 of the spacer flow guide 140 is angled in the present embodiment to encourage flow of the portion of the upper and lower gas flows 252, 262 downward along the z-axis 16 and into the main exhaust channel 220. In the present embodiment, the upper and lower gas flows 252, 262 may collectively form the inlet gas flow 80 discussed above with reference to FIG. 1. The main exhaust channel 220 fluidly couples the upstream portion 202 of the lower portion 248 of the chamber 32 to a gas outlet 290 of the AM system 10. Further, at least a portion of the upper gas flow 252 is directed from the upstream portion 202 of the chamber 32, proximate the top wall 54, and into the bypass exhaust channel 224. The bypass exhaust channel 224 then directs or introduces the portion of the upper gas flow 252 therein into the main exhaust channel 220, downstream of a main exhaust channel entrance 292 of the main exhaust channel 220 and upstream of the gas outlet 290. As such, the gas outlet 290 discharges the exhaust gas flow 82 from the downstream portion 204 of the chamber 32. The discharged exhaust gas flow 82 includes the upper gas flow 252, the lower gas flow 262, as well as a substantial portion of any particulates that are generated during the AM process.

In the illustrated embodiment, the gas outlet 290 is defined in the rear wall 102 of the housing 30, opposite the front wall 100 through which the upper and lower gas flows 252, 262 enter the chamber 32. The gas outlet 290 may be defined within the rear wall 102 proximate the lower portion 248 of the chamber 32, such that at least a portion of the lower gas flow 262 travels directly, tangentially above the build platform 40, through the main exhaust channel 220, and through the gas outlet 290. While the gas outlet 290 is illustrated as a generally rectangular slot extending along the chamber width 126 for simplicity, the gas outlet 290 can be of any suitable shape (e.g., circular, polygon, oval) that extends along any suitable portion of the chamber width 126 to enable sufficient discharging of the exhaust gas flow 82. In some embodiments, the gas outlet 290 may include multiple openings on the rear wall 102 to discharge the exhaust gas flow 82.

The gas outlet 290 may be coupled to a gas moving device to draw and discharge the exhaust gas flow 82 from the chamber 32. The gas moving device may be a fan or a blower in some embodiments. Additionally, in some embodiments, the gas moving device may also include a filtration system that is configured to filter the exhaust gas flow 82, for example, by removing any particulates suspended within the exhaust gas flow 82 that have been removed from the chamber 32. After filtration, the exhaust gas flow 82 may be directed toward the upper gas delivery device 256 and/or the lower gas delivery device 276 for reuse in the upper and lower gas flow systems 242, 246. The upper and lower gas flows 252, 262 may include inert gasses, such as argon or nitrogen, but may additionally include any other suitable gas configured to facilitate removal of the particulates generated during operation of the AM system 10 from the chamber 32.

It should be noted that because the AM system 10 employs the spacer flow guide 140, the interior volume 34 of the chamber 32 for receiving gas flows therein is efficiently partitioned into the spacer-occupied volume 142, which is occupied by the spacer flow guide 140 (and in some embodiments, includes the volume occupied by the auxiliary spacer insert 130), and the gas volume 144 for directing the upper and lower gas flows 252, 262. The gas volume 144 is therefore reduced relative to the interior volume 34 of the chamber 32, enabling a reduction in the flow rates and corresponding operating costs of the AM system 10 to remove particulates from the chamber 32. Moreover, a relatively smaller or less powerful pump or blower may be used for delivering the upper gas flow 252 and/or the lower gas flow 262 in certain embodiments, relative to a pump or blower for delivering gas flows to a chamber that lacks the spacer flow guide 140 and/or the auxiliary spacer insert 130 and, therefore, has a larger gas volume.

Figure 3:
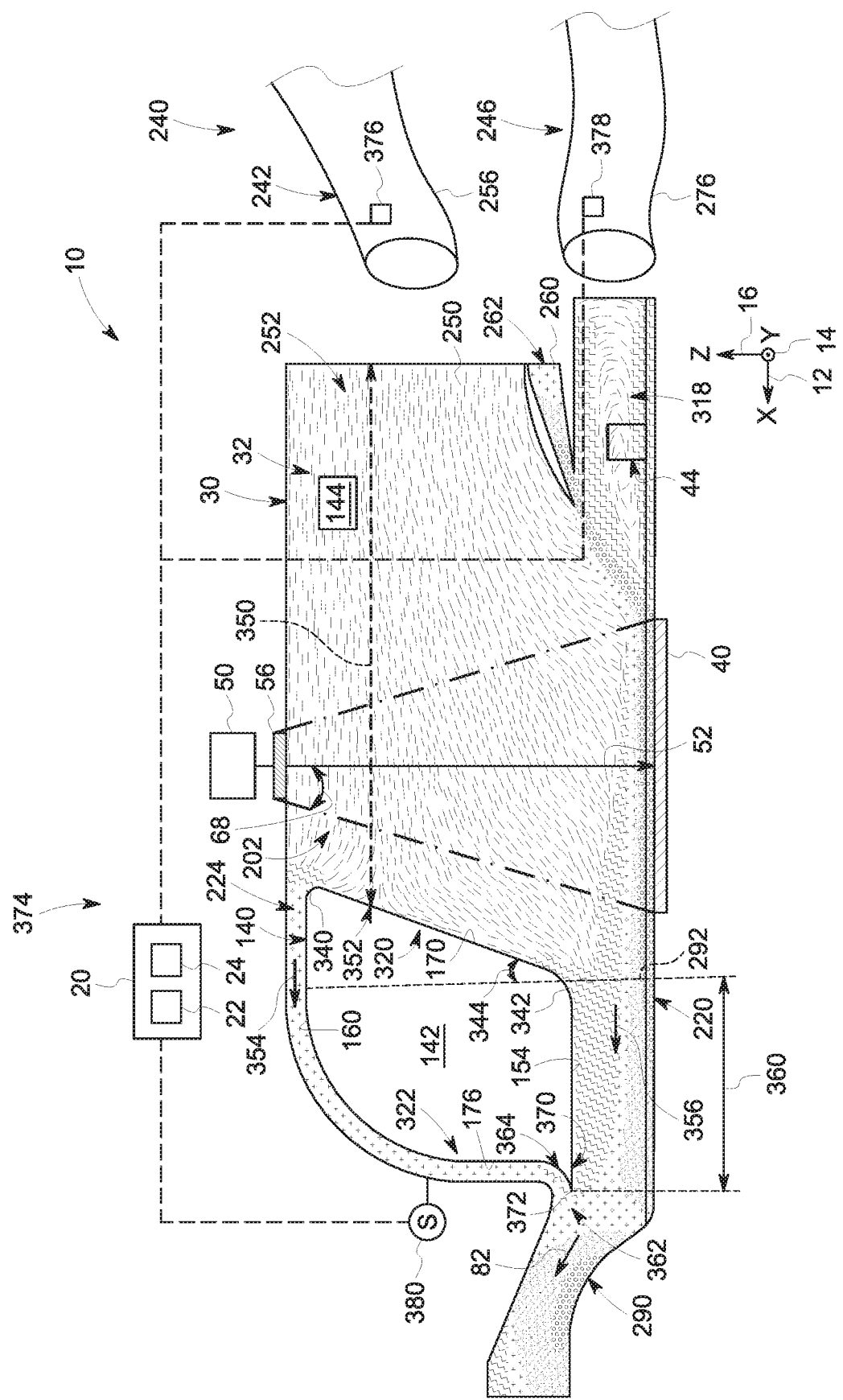
FIG. 3 is a schematic cross-sectional view illustrating gas flow for an embodiment of the AM system of FIG. 2 having the spacer flow guide with a first guiding angle for directing gas flows, in accordance with present embodiments.

As set forth above, the spacer flow guide 140 may help substantially reduce or eliminate recirculation or turbulence within the chamber 32, and thus improve the performance and efficiency of the AM system 10 to enable particulates generated during the AM process to be efficiently removed with a reduced gas flow. FIG. 3 is a schematic cross-sectional view illustrating an embodiment of the chamber 32 having the spacer flow guide 140 disposed therein. In the present embodiment, the AM system 10 includes a tooling area or powder application sub-chamber 318, in which the powder application device 44 (e.g., recoater blade) is disposed. Moreover, the spacer flow guide 140 is positioned within chamber 32 to block or fluidly separate the spacer-occupied volume 142 restricted by the spacer flow guide 140 from the gas volume 144 of the chamber 32 through which the upper and lower gas flows 252, 262 are directed. As illustrated, the spacer-occupied volume 142 is bounded in a plane formed between the z-axis 16 and the x-axis 12 by the top surface 160, the bottom surface 154, the front surface 170 extending along an upstream portion 320 of the spacer flow guide 140 between the top and bottom surfaces 154, 160, and the back surface 176 extending along a downstream portion 322 of the spacer flow guide 140 between the top and bottom surfaces 154, 160.

In the illustrated embodiment, a top upstream edge 340 or leading edge of the spacer flow guide 140 extends further from the rear wall 102 of the housing 30 than a bottom upstream edge 342 of the spacer flow guide 140, such that the front surface 170 is disposed at a guiding angle 344 of approximately 20° relative to the z-axis 16 in the present embodiment. The guiding angle 344 of the spacer flow guide 140 may generally be formed or selected to correspond to (e.g., within 10%), be substantially the same as, or be substantially parallel to the beam angle 62 of the focused energy beam 52 that the energy generating system 50 directs through the laser window 56 and onto the build platform 40. As noted herein, the guiding angle 344 that is "substantially" parallel or the same as the beam angle 62 refers to a guiding angle 344 that is within ±10%, ±5%, or ±1% of the beam angle 62, in different embodiments. Additionally, the guiding angle 344 may be any suitable angle, such as an angle between about 10 degrees and about 60 degrees. As additionally noted herein, an angle that is "about" a value refers to an angle that is within ±10%, ±5%, or ±1% of the value, in different embodiments. Due to the guiding angle 344 of the front surface 170, the spacer flow guide 140 may be formed with an increased or maximized length that extends closer to the build platform 40 and partitions a greater portion of the interior volume 34 of the chamber 32 as the spacer-occupied volume 142 than embodiments of the spacer flow guide 140 with a front surface that is substantially vertical.

Moreover, gas flow within the chamber 32, including the upper and lower gas flows 252, 262, is illustrated in the present embodiment by various fill patterns, each fill pattern representative of a corresponding flow velocity or range of flow velocities. For gas flow represented by a fill pattern having lines, the lines generally have an orientation that indicates a flow direction of the gas flow within a respective portion of the chamber 32. For example, the upper gas flow 252 provided into the chamber 32 through the upper gas inlet 250 generally traverses the chamber 32 in a relatively straight direction (e.g., parallel to the x-axis 12), then splits into a first portion of the upper gas flow 252 that is directed downward to the build platform 40 and a second portion of the upper gas flow 252 that is directed upward to the bypass exhaust channel 224. The upper gas flow 252 may generally separate into the first and second portions along an open length 350 of the chamber 32 defined between the upper gas inlet 250 and a split point 352 on the front surface 170 of the spacer flow guide 140. The split point 352 may be a point or location at which the spacer flow guide 140 redirects or splits the upper gas flow 252, and thus may move up or down along the front surface 170 based on the current operation of the AM system 10.

Upon contacting the front surface 170 of the spacer flow guide 140, any remaining portion of the upper gas flow 252 traveling horizontally is directed into either the main exhaust channel 220 or the bypass exhaust channel 224, each respectively defined between the spacer flow guide 140 and the housing 30. In particular, the bypass exhaust channel 224 provides an outlet from the upstream portion 202 of the chamber 32 through which a portion of the upper gas flow 252 within the bypass exhaust channel 224 (also referred to herein as a bypass exhaust gas flow 354) may experience laminar flow. Indeed, compared to arrangements having a chamber of a similar shape and/or volume without a bypass exhaust channel, the present AM system 10 may utilize generally lower flow rates and/or flow volumes for the upper and lower gas flows 252, 262 to continuously remove particulates from the chamber 32 without substantial recirculation. Indeed, for the illustrated embodiment in which the gas flow system 240 includes the upper and lower gas flow systems 242, 246, a flow velocity ratio of the upper gas flow 252 to the lower gas flow 262 into the chamber 32 may be between about 3:1 and about 1:1, or about 2:1. By comparison, other AM systems that lack the spacer flow guide 140 may utilize a flow velocity ratio of the upper gas flow to the lower gas flow of more than 6:1. As noted herein, a flow velocity ratio that is "about" a value refers to a flow velocity ratio that is within ±10%, ±5%, or ±1% of the value, in different embodiments.

Moreover, the lower gas flow 262 provided into the chamber 32 through the lower gas inlet 260 generally flows at a downward angle, and then flows generally parallel to the build platform 40, before traveling over the build platform 40 and into the main exhaust channel entrance 292 of the main exhaust channel 220. The portion of the upper gas flow 252 and the portion of the lower gas flow 262 that enter the main exhaust channel entrance 292 are hereinafter referred to as a main exhaust gas flow 356. A separation distance 360 downstream of the main exhaust channel entrance 292, the bypass exhaust channel 224 is fluidly coupled to the main exhaust channel 220. As such, the bypass exhaust gas flow 354 that traverses the bypass exhaust channel 224 is introduced into the main exhaust gas flow 356 within the main exhaust channel 220. In the present embodiment, a connection point 362 or injection point between the two channels 220, 224 is oriented to align with a flow direction of the main exhaust gas flow 356 within the main exhaust channel 220 (e.g., along the x-axis 12), such that the bypass exhaust channel 224 includes an elbow bend 364 to reorient the bypass exhaust gas flow 354 therein from flowing along the z-axis 16 to flow along the x-axis 12. As such, the exhaust gas flow 82 (e.g., including the bypass exhaust gas flow 354 and the main exhaust gas flow 356) downstream of the connection point 362 from both channels 220, 224 and out of the gas outlet 290 is generally laminar. The connection point 362 may generally be defined between the housing 30 and the spacer flow guide 140 by a downstream protrusion 370 of the spacer flow guide 140 that is tapered into a sharp trailing edge 372. In other embodiments, the connection point 362 may have another suitable shape or configuration, such as an eductor, such that respective flow rates of the gas flows 354, 356 along the channels 220, 224 are sufficient to maintain or reduce turbulence of the gas flows 354, 356 below a threshold level, such as below a level at which flow transitions from laminar to turbulent flow (e.g., as defined by a critical Reynolds number).

Moreover, the AM system 10 includes a control system 374 that controls the flow rates of the upper and lower gas flows 252, 262 to reduce or eliminate recirculation and/or particle buildup within the chamber. For example, an upper actuator 376 of the upper gas delivery device 256 and a lower actuator 378 of the lower gas delivery device 276 are operatively coupled to the controller 20 (e.g., which is a component of the control system 374 of the AM system 10). The actuators 376, 378 may be any suitable controllable devices that adjust the upper and lower gas flows 252, 262 from the upper gas delivery device 256 and the lower gas delivery device 276, such as one or more fluid valves and/or one or more pumps or blowers. By adjusting the actuators 376, 378, the controller 20 and/or the control system 374 may therefore control the upper and lower gas flows 252, 262, in addition to the remainder of the AM system 10 discussed above. The controller 20 may be configured to control one or more fluid flow characteristics of the upper and lower gas flows 252, 262 to substantially reduce or eliminate gas entrainment or turbulent gas flow within the chamber 32, such that the particulates may be effectively removed from the chamber 32 (e.g., discharged from the chamber 32 via the gas outlet 290). The flow characteristics may include flow distribution, flow rate (e.g., mass flow rate, volume flow rate), flow velocity, flow direction or angle, flow temperature, or any combination thereof.

Additionally, the control system 374 of the AM system 10 includes one or more sensors to measure operating parameters within the chamber 32 in order to control the upper and lower gas flow systems 242, 246 based on these operating parameters. For example, as illustrated, a sensor 380 or sensor assembly is fluidly coupled to the bypass exhaust channel 224 to monitor parameters indicative of a flow rate and/or a particulate concentration of the bypass exhaust gas flow 354 therein. That is, because the bypass exhaust channel 224 includes a smaller cross section and/or volume than the main exhaust channel 220 or the upstream portion 202 of the chamber 32, the bypass exhaust gas flow 354 within the bypass exhaust channel 224 may be effectively monitored with fewer sensors or less sensitive sensors for smaller volumes than sensors appropriate for other portions of the chamber 32. However, in some embodiments, the AM system 10 includes multiple sensors disposed in various locations, such as within the gas outlet 290, downstream of the gas outlet 290, upstream of the spacer flow guide 140, and so forth.

The sensor 380 may be any suitable sensor for monitoring the operating parameters of the bypass exhaust gas flow 354, including a concentration sensor, a pressure sensor, a flow rate sensor, a particulate or smoke sensor, and so forth. Additionally, as used herein, the term "sensor" may include any suitable instrument, including a switch or a transducer, capable of acquiring feedback through direct or indirect observation. The sensor 380 is communicatively coupled to the controller 20, which receives and analyzes signals from the sensor 380, thus enabling the controller 20 to determine and monitor the bypass exhaust gas flow 354 within the bypass exhaust channel 224.

For example, during operation of the AM system 10, the controller 20 receives feedback from the sensor 380 that is indicative of an operating parameter, such as a flow rate or a particulate concentration, of the bypass exhaust gas flow 354. Based on the feedback indicative of the operating parameter, the controller 20 may determine whether the operating parameter is beyond or outside a predefined operating parameter threshold (e.g., a threshold previously stored in the memory circuitry 22) set for the operating parameter. In response to determining that the operating parameter is within its respective operating threshold, the controller 20 may continue to operate the AM system 10 according to its current set points. However, in response to determining that the operating parameter is outside (e.g., above or below) its respective operating parameter threshold, the controller 20 may perform a control action to adjust the operating parameter. For example, the controller 20 may instruct the gas flow system 240 to adjust a flow rate of one or both of the gas flows 252, 262 provided to the build chamber to adjust the current value of the operating parameter to be within the predefined operational thresholds. Additionally, the controller 20 may provide an alert to a user interface or server indicative of the operating parameter, such as an alert indicating that maintenance of the AM system 10 is recommended.

For example, the controller 20 may monitor the flow rate of the bypass exhaust gas flow 354 within the bypass exhaust channel 224 to ensure that the flow rate is within a tolerance or range of a target flow rate, hereinafter referred to as a flow rate threshold. Indeed, as recognized herein, a flow rate below the flow rate threshold may be indicative of stagnation of the bypass exhaust gas flow 354 within the bypass exhaust channel 224 and/or stagnation of the upper and lower gas flows 252, 262 within the upstream portion 202 of the chamber 32, which may lead to particle accumulation or buildup. Additionally, a flow rate above the flow rate threshold may be indicative of an oversupply of the upper and lower gas flows 252, 262 to the chamber 32, because a lower, more cost-effective flow rate may be sufficient to properly operate the AM system 10. In certain conditions, a flow rate above the flow rate threshold may also be indicative of turbulent flow (e.g., flow at high Reynolds numbers)

in which inertial forces of the bypass exhaust gas flow 354 overpower the viscous forces, creating flow instabilities that may lead to recirculation of the particulates within the chamber 32. Accordingly, if the controller 20 determines that, based on the feedback from the sensor 380, the flow rate of the bypass exhaust gas flow 354 within the bypass exhaust channel 224 is below the flow rate threshold, the controller 20 instructs the gas flow system 240 to provide an increased flow rate of one or both of the upper and lower gas flows 252, 262 into the chamber 32. Additionally, if the controller 20 determines that the flow rate of the bypass exhaust gas flow 354 within the bypass exhaust channel 224 is above the flow rate threshold, the controller 20 instructs the gas flow system 240 to provide a decreased flow rate of one or both of the upper and lower gas flows 252, 262 into the chamber 32, thereby conserving a portion of the upper and lower gas flows 252, 262 and/or reducing turbulence therein.

The controller 20 may additionally or alternatively directly monitor the particulate concentration of the bypass exhaust gas flow 354 within the bypass exhaust channel 224 to ensure that the particulate concentration is within a tolerance or range of a target particulate concentration, hereinafter referred to as a particulate concentration threshold. The controller 20 may generally control the gas flow system 240 to ensure the particulate concentration within the chamber 32 remains below the particulate concentration threshold to reduce or prevent particle accumulation or buildup within the chamber 32. Additionally, a lower bound of the particulate concentration threshold may be set to a value that is able to be effectively handled by a cost-effective flow rate of the upper and lower gas flows 252, 262. Accordingly, if the controller 20 determines that the particulate concentration is above the particulate concentration threshold, the controller instructs the gas flow system 240 to provide an increased flow rate of one or both of the upper and lower gas flows 252, 262 into the chamber 32. Alternatively, if the controller 20 determines that the particulate concentration is above the particulate concentration threshold, the controller 20 instructs the gas flow system 240 to conserve the upper and lower gas flows 252, 262 by providing a decreased flow rate of one or both of the upper and lower gas flows 252, 262 into the chamber 32.

As such, in certain embodiments, the controller 20 operates the AM system 10 to maintain the flow rate of the bypass exhaust gas flow 354 and/or the particulate concentration of the bypass exhaust gas flow 354 within their respective operating parameter thresholds. In some embodiments, the controller 20 may place more weight on the particulate concentration of the bypass exhaust gas flow 354, such that the controller 20 adjusts the AM system 10 to maintain the particulate concentration within the particulate concentration threshold, even if a flow rate higher than the flow rate threshold is utilized. In some embodiments, the controller 20 may additionally or alternatively monitor a rate of change of the operating parameter, which is compared to a respective rate change threshold, such that the control action may be taken based on the rate of change of the operating parameter. Additionally, although discussed above with reference to the sensor 380 being capable of monitoring the flow rate and the particulate concentration of the bypass exhaust gas flow 354, it is to be understood that two separate sensors, one for monitoring each operating parameter, may instead be employed within the AM system 10 in certain embodiments.

Figure 4:
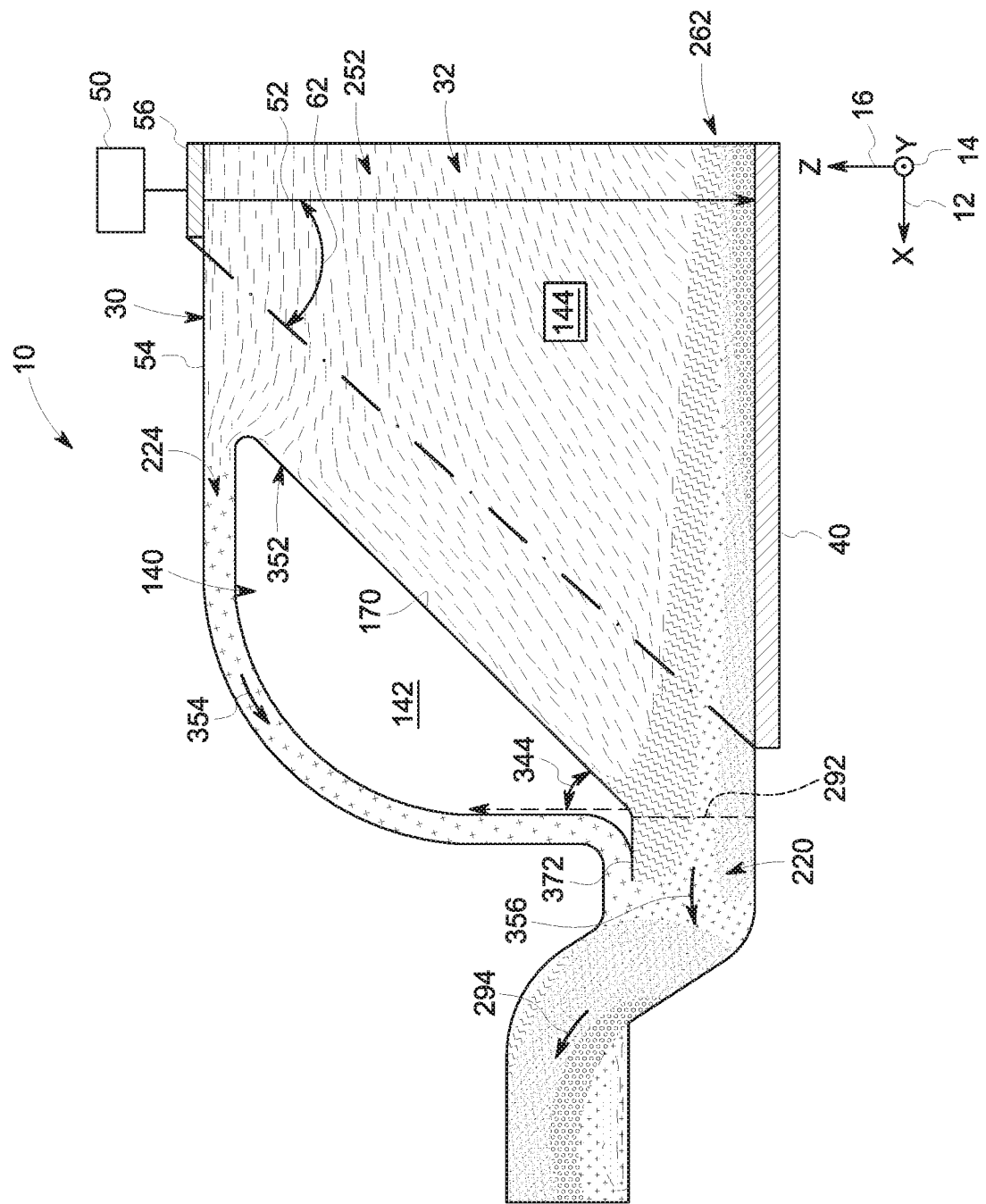
FIG. 4 is a partial schematic cross-sectional view illustrating gas flow for an embodiment of the AM system of FIG. 2 having the spacer flow guide with a second guiding angle for directing gas flows, in accordance with present embodiments.

The spacer flow guide 140 may be formed or adjusted in shape to suit any embodiment of the AM system 10. For example, FIG. 4 is a partial schematic cross-sectional view illustrating an embodiment of the chamber 32 having the spacer flow guide 140 disposed therein. As illustrated, the spacer flow guide 140 of FIG. 4 is formed with the front surface 170 having the guiding angle 344 of 45° relative to the z-axis 16. As such, compared to the spacer-occupied volume 142 of FIG. 3, the spacer-occupied volume 142 defined by the illustrated spacer flow guide 140 is smaller. The spacer flow guide 140 may generally have a D-shaped cross section around which the bypass exhaust channel 224 and the main exhaust channel 220 are respectively formed. Due to the steeper slope of the front surface 170 of the spacer flow guide 140, a portion of the upper gas flow 252 that is directed to the main exhaust channel 220 to form the main exhaust gas flow 356 may be larger than the portion of the upper gas flow 252 that is directed to the main exhaust channel 220 of FIG. 3. Indeed, as illustrated, the split point 352 on the front surface 170 of the spacer flow guide 140 is closer to the top wall 54 of the housing 30 than the split point 352 of FIG. 3.

Additionally, the present energy generating system 50 may provide the focused energy beam 52 to the build platform 40 at a beam angle 62 of 45°, such that the spacer flow guide 140 is disposed proximate the build platform 40 without interfering with the build process. The spacer flow guide 140 also includes the sharp trailing edge 372 for smoothly introducing the bypass exhaust gas flow 354 from the bypass exhaust channel 224 into the main exhaust gas flow 356 within the main exhaust channel 220. The bypass exhaust gas flow 354 enters the main exhaust channel 220 downstream of the main exhaust channel entrance 292, forming the exhaust gas flow 82 in combination with the main exhaust gas flow 356. Accordingly, the specific dimensions of the spacer flow guide 140 may be adapted to the physical layout of various AM systems, thereby excluding the spacer-occupied volume 142 from the gas volume 144 within the chamber 32. Compared to a chamber lacking the spacer flow guide 140, the chamber 32 having the gas volume 144 utilizes a reduced gas flow rate of the upper and lower gas flows 252, 262 for removing particulates.

Figure 5:
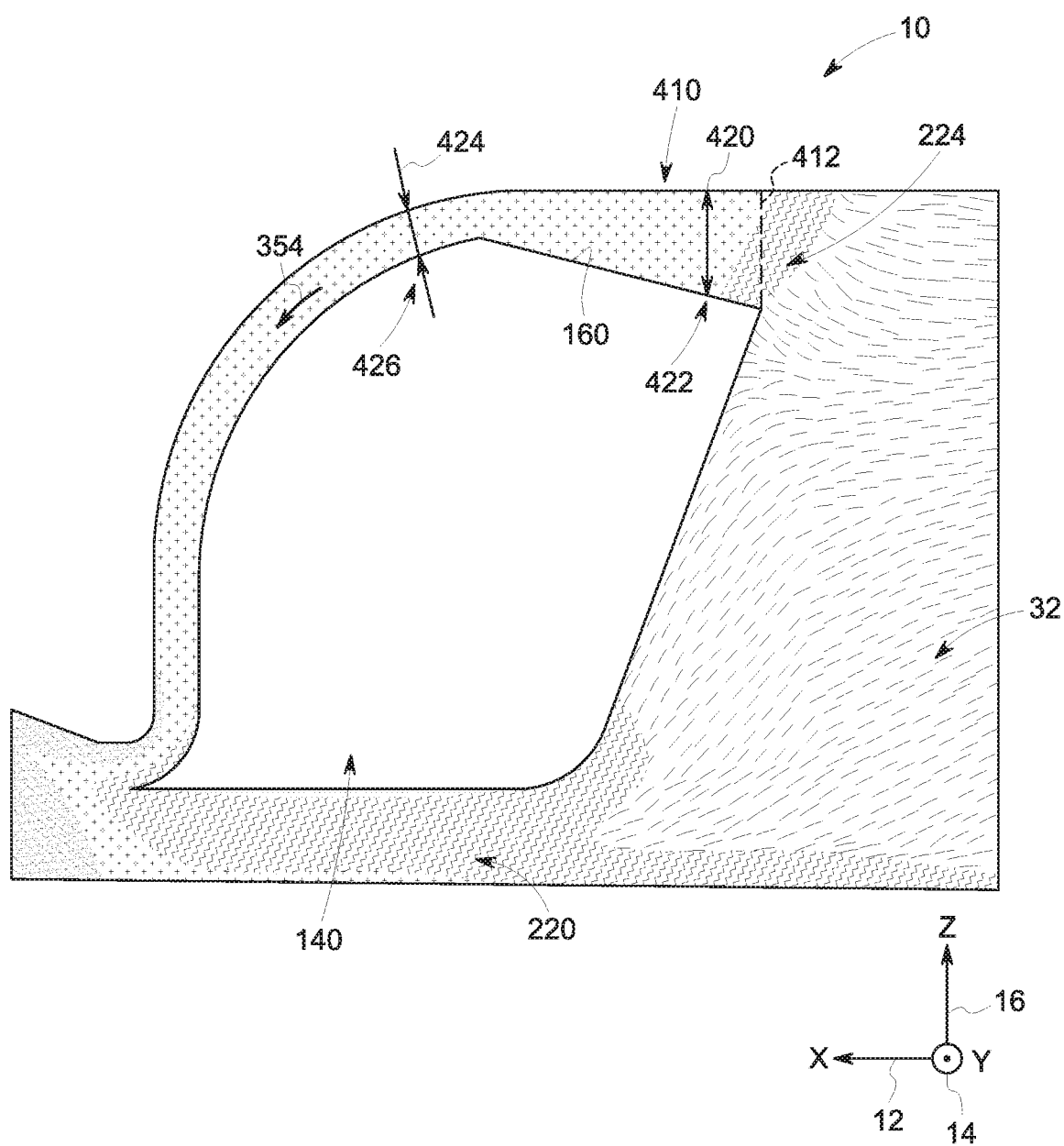
FIG. 5 is a partial schematic cross-sectional view illustrating gas flow for an embodiment of the AM system of FIG. 2 having a bypass exhaust channel with a tapered neck formed by the spacer flow guide, in accordance with present embodiments.

The spacer flow guide 140 may include additional physical features to promote the movement of the gas flows 354, 356 through the bypass exhaust channel 224 and the main exhaust channel 220, as described with reference to FIGS. 5-7 below. FIG. 5 is a partial schematic cross-sectional view illustrating an embodiment of the AM system 10 in which the spacer flow guide 140 forms a tapered neck portion 410 directly downstream of a bypass exhaust channel entrance 412 of the bypass exhaust channel 224. The top surface 160 of the spacer flow guide 140 is sloped or angled along the x-axis 12, such that a first height 420 of an upstream portion 422 of the bypass exhaust channel 224 is greater than a second height 424 of a downstream portion 426 of the bypass exhaust channel 224. As such, the bypass exhaust channel entrance 412 provides a greater area through which the bypass exhaust gas flow 354 may be directed or funneled into the bypass exhaust channel 224, thus reducing recirculation and/or a gas flow rate within the chamber 32.

Figure 6:
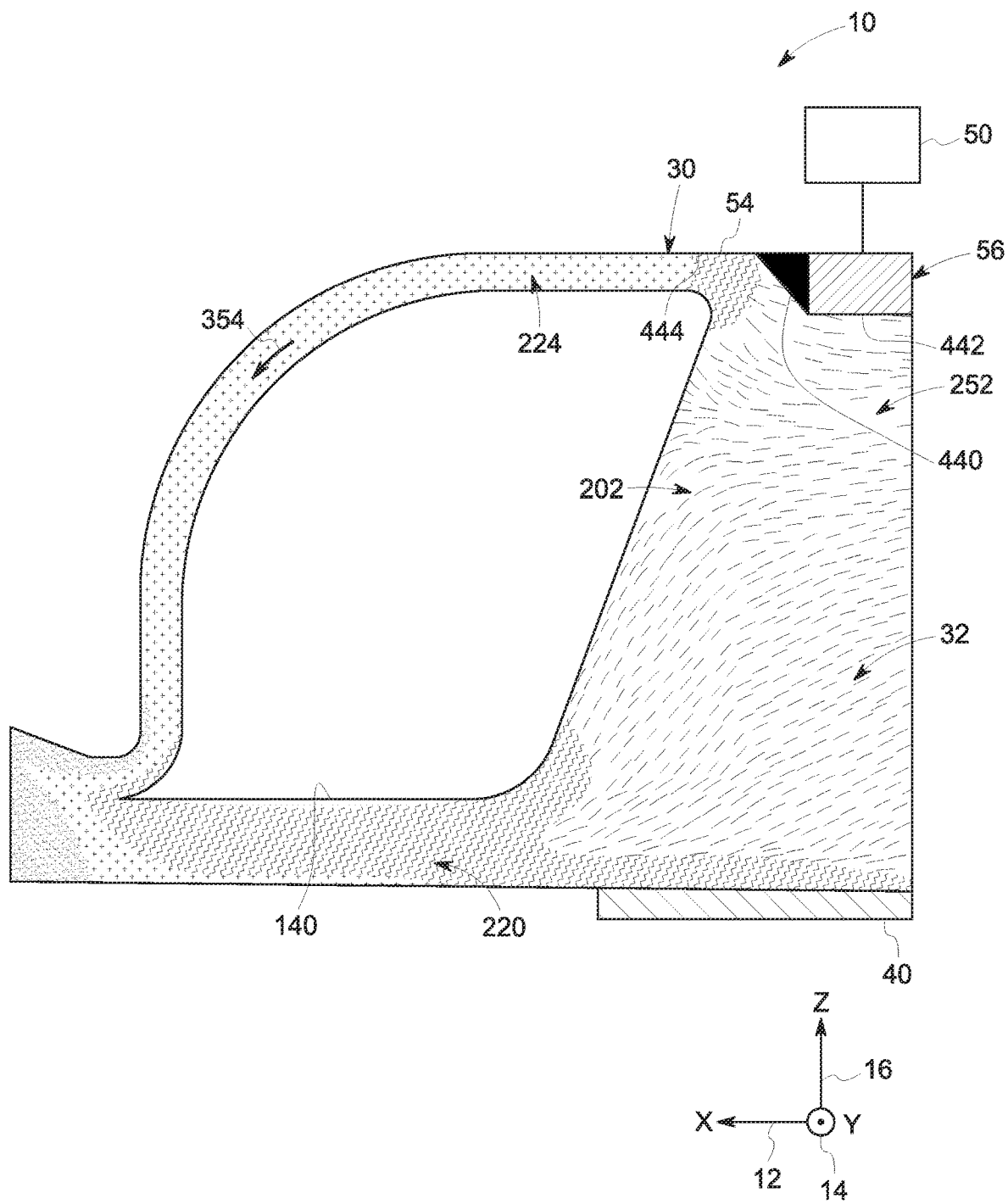
FIG. 6 is a partial schematic cross-sectional view illustrating gas flow for an embodiment of the AM system of FIG. 2 having a lowered laser window and a bypass exhaust channel formed by the spacer flow guide, in accordance with present embodiments.

FIG. 6 is a partial schematic cross-sectional view illustrating an embodiment of the AM system 10 in which the laser window 56 is protruding into (e.g., recessed into, extends vertically downward from) the top wall 54 of the housing 30. The energy generating system 50 may therefore be positioned closer to the build platform 40 to limit potential scattering of the focused energy beam 52, compared to an energy generating system that is positioned further from the build platform 40. Moreover, the laser window 56 protrudes into the chamber 32 and directs a portion of the upper gas flow 252 within the chamber 32 into the bypass exhaust channel 224 to form the bypass exhaust gas flow 354. That is, a portion of the upper gas flow 252 may impinge on the laser window 56, change flow direction, and enter the bypass exhaust channel 224. In some embodiments, the laser window 56 may be fitted or formed with a bevel edge 440 to provide a smooth transition for the gas flow from a surface 442 of the laser window 56 to an inner surface 444 of the top wall 54. The laser window 56 positioned partially or wholly within the chamber 32 may alter a flow direction of the upper gas flow 252 to be vertical (instead of horizontal) when entering the bypass exhaust channel 224, in some embodiments. The laser window 56 may elongate an effective length of the bypass exhaust channel 224 in some embodiments by increasing a vertical distance between the bypass exhaust channel 224 and the upstream portion 202 of the chamber 32, thereby improving a funneling effect for directing the bypass exhaust gas flow 354 into the bypass exhaust channel 224.

Figure 7:
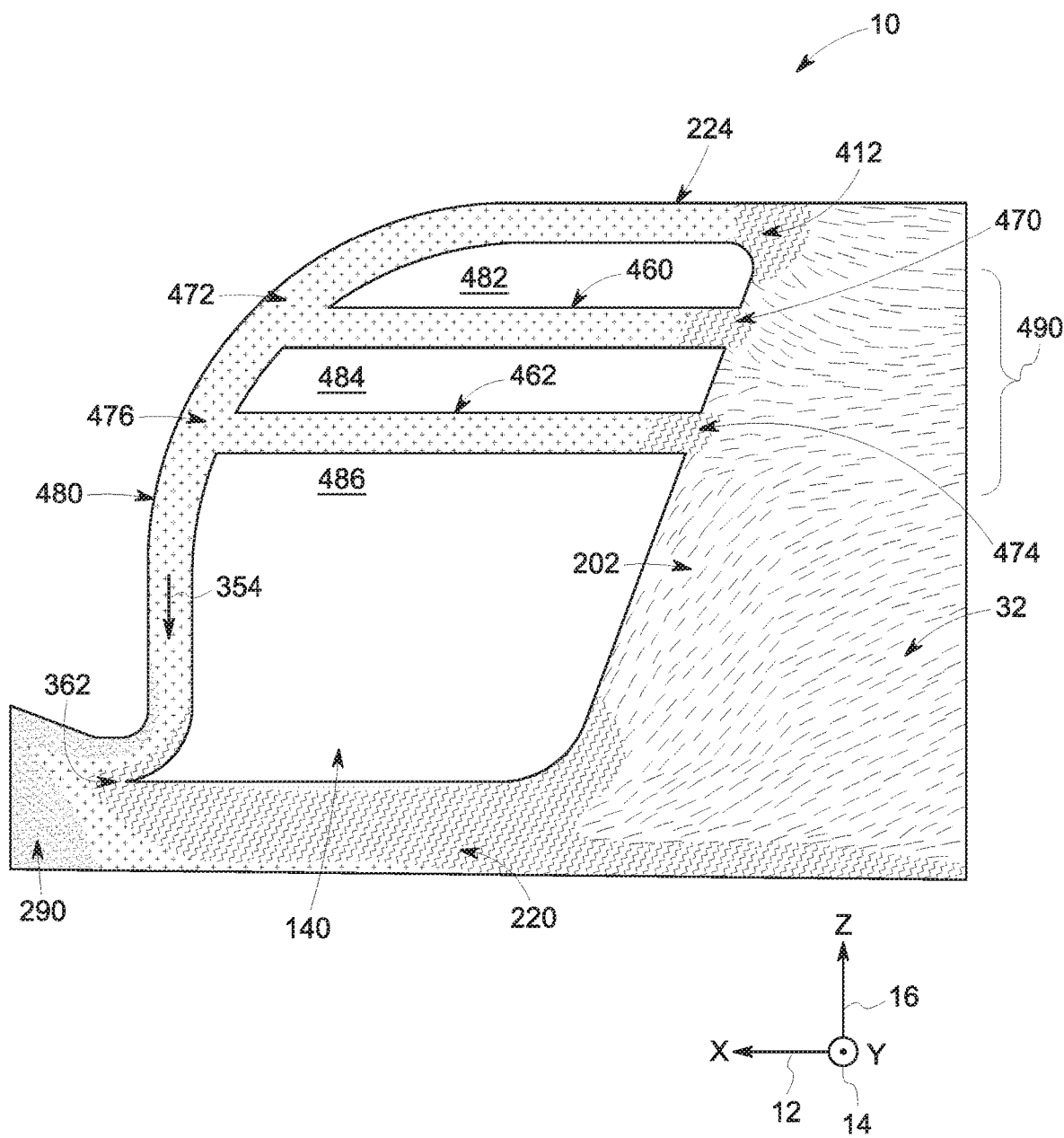
FIG. 7 is a partial schematic cross-sectional view illustrating gas flow for an embodiment of the AM system of FIG. 2 having multiple interconnect channels formed through the spacer flow guide and coupled to a bypass exhaust channel, in accordance with present embodiments.

FIG. 7 is a partial schematic cross-sectional view illustrating an embodiment of the AM system 10 having a first interconnect channel 460 and a second interconnect channel 462 formed through the spacer flow guide 140. The interconnect channels 460, 462 (e.g., interconnect exhaust channels) extend through the spacer flow guide 140 along the x-axis 12 to fluidly couple a respective portion of the upstream portion 202 of the chamber 32 to the bypass exhaust channel 224. For example, the first interconnect channel 460 has a first interconnect channel entrance 470 disposed vertically beneath the bypass exhaust channel entrance 412 and a first interconnect channel exit 472 fluidly coupled to the bypass exhaust channel 224 downstream of the bypass exhaust channel entrance 412. The illustrated second interconnect channel 462 includes a second interconnect channel entrance 474 that is disposed vertically beneath the bypass exhaust channel entrance 412 and the first interconnect channel entrance 470. Additionally, the second interconnect channel 462 has a second interconnect channel exit 476 that is fluidly coupled downstream of the first interconnect channel exit 472, upstream of the connection point 362 between the bypass exhaust channel 224 and the main exhaust channel 220.

As such, a portion of the upper and lower gas flows 252, 262 within the chamber 32 may be directed within any of the entrances 412, 470, 474, combined within a downstream portion 480 of the bypass exhaust channel 224 as the bypass exhaust gas flow 354, and directed out of the chamber 32. The interconnect channels 460, 462 may, therefore, facilitate reduction or elimination of recirculation within the chamber 32 by providing additional flow paths between the spacer flow guide 140 and the gas outlet 290. It is to be understood that the interconnect channels 460, 462 may span an entire width of the spacer flow guide 140 defined along the y-axis 14 in some embodiments, such that the spacer flow guide 140 may be a collection of three separate spacer flow guide portions 482, 484, 486. Alternatively, the interconnect channels 460, 462 may span only a portion of the width 150 of the spacer flow guide 140. In such embodiments, multiple interconnect channels may be arranged along the y-axis 14 (e.g., disposed behind one another in the present view of the plane between the x-axis 12 and the z-axis 16), such that the upper and lower gas flows 252, 262 within the chamber 32 encounter an array of openings at the front surface 170 of the spacer flow guide 140. Additionally, although two interconnect channels 460, 462 are illustrated in a vertically intermediate portion 490 of the spacer flow guide 140, it is to be understood that any suitable number of interconnect channels 460, 462 may be included along any suitable vertical extent of the spacer flow guide 140.

Figure 8:
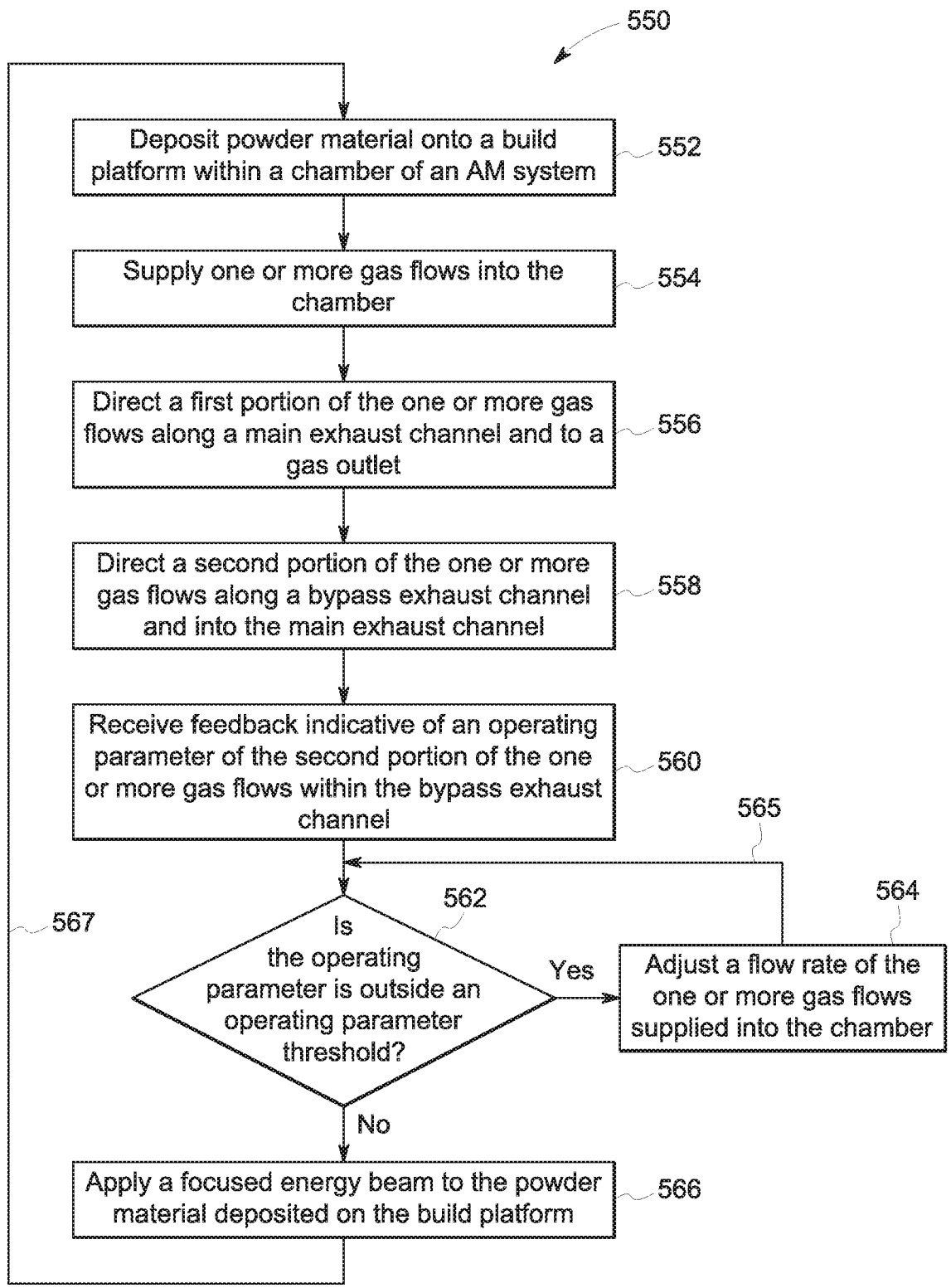
FIG. 8 is a flow diagram representing an embodiment of a process for operating the AM system of FIG. 2, in accordance with present embodiments.

With the foregoing in mind, FIG. 8 is a flow chart of an embodiment of a process 550 whereby the AM system 10 may be operated during fabrication of an article. The following discussion references element numbers used throughout FIGS. 1-7. It is to be understood that the steps discussed herein are merely exemplary, and certain steps may be omitted, repeated, performed simultaneously, and/or performed in a different order that the order discussed herein in other embodiments. It should be noted that one or more of the steps of the process 550 may be stored in the memory circuitry 22 and executed by the processing circuitry 24 of the controller 20. For the embodiment illustrated in FIG. 5, the process 550 begins with depositing (step 552) a quantity of a powder material onto the build platform 40 within the chamber 32 of the AM system 10. For example, the controller 20 instructs the powder application device 44 to deposit the powder material onto the build platform 40. The controller 20 instructs the positioning system 70 to move the powder application device 44 and/or the build platform 40 to any suitable positions relative to one another along the x-, y-, and z-axis 12, 14, 16, or a combination thereof, to deposit the powder material in a layer-by-layer manner during each deposition period of the powder application device 44.

The illustrated embodiment of the process 550 continues with supplying (step 554) one or more gas flows, such as the upper gas flow 252 and the lower gas flow 262, into the chamber 32. For example, the controller 20 instructs the gas flow system 240 to supply the upper and lower gas flows 252, 262 into the chamber 32 with any suitable flow characteristics, such as flow distribution, flow rate (e.g., mass flow rate, volume flow rate), flow temperature, or any combination thereof, as discussed above. The process 550 includes directing (step 556) a first portion of the one or more gas flows as the main exhaust gas flow 356 along the main exhaust channel 220 and to the gas outlet 290. For example, as discussed above, the main exhaust channel 220 is defined between the bottom surface 154 of the spacer flow guide and the housing 30. The main exhaust channel 220 therefore extends between the build platform 40 and the gas outlet 290 to receive and direct the main exhaust gas flow 356 from the chamber 32.

The process 550 includes directing (step 558) a second portion of the one or more gas flows as the bypass exhaust gas flow 354 along the bypass exhaust channel 224, which fluidly couples the upstream portion 202 of the chamber 32 to the main exhaust channel 220. As discussed above, the bypass exhaust channel 224 is defined between the top wall 54 and the rear wall 102 of the housing 30 and the top surface 160 and the back surface 176 of the spacer flow guide 140. The bypass exhaust channel 224 directs the bypass exhaust gas flow 354 into the main exhaust channel 220. Thus, as discussed above, the spacer flow guide 140 desirably partitions the spacer-occupied volume 142 from the gas volume 144 of the chamber 32, reducing a utilized flow rate of the one or more gas flows for removing particulates from the chamber 32 compared to AM systems without a spacer flow guide 140.

Moreover, as discussed above, the AM system 10 may regulate its operation based on operating parameters monitored by the sensor 380 fluidly coupled to the bypass exhaust channel 224. Thus, the illustrated process 550 includes receiving (step 560) feedback indicative of the operating parameter of the bypass exhaust gas flow 354 within the bypass exhaust channel 224. As discussed above with reference to FIG. 3, the operating parameter may be any suitable parameter indicative of a flow rate and/or a particulate concentration of the bypass exhaust gas flow 354. Moreover, the process 550 includes determining (step 562) whether the operating parameter is outside a respective operating parameter threshold. The operating parameter threshold may be a flow rate threshold, a particulate concentration threshold, or any other suitable threshold against which an operating parameter of the bypass exhaust gas flow 354 may be compared.

In response to determining that the operating parameter is outside the operating parameter threshold, the process 550 includes adjusting (step 564) a flow rate of the one or more gas flows supplied into the chamber 32. For example, the controller 20 may instruct the gas flow system 240 to adjust a flow rate of the upper and lower gas flows 252, 262 provided to the chamber 32 to adjust the current value of the operating parameter to be within, or closer to, the operating parameter threshold. Then, the process 550 returns to step 562 to continue determining whether the operating parameter is outside the operating parameter threshold, as indicated by arrow 565.

In response to determining that the operating parameter is not outside the operating parameter threshold, the process 550 includes selectively applying (step 566) a focused energy beam to the powder material deposited on the build platform 40. For example, the controller 20 instructs the energy generating system 50 to apply the focused energy beam 52, such as a laser beam, to portions of the powder bed 46. As discussed above, the focused energy beam 52 selectively melts and/or sinters the powder material of the powder bed 46 in a predefined manner to form a solidified layer while the upper and/or lower gas flows 252, 262 are supplied.

Generally, embodiments of the present disclosure include providing the gas flows 252, 262 in step 554 simultaneously with applying the focused energy beam 52 in step 566 to enable particulates generated during the build process to be effectively removed. In some embodiments, supplying the gas flows 252, 262 in step 554, directing the main exhaust gas flow 356 in step 556, and directing the bypass exhaust gas flow 354 in step 558 may be performed simultaneously. In some embodiments, applying the focused energy beam 52 in step 566 may be performed simultaneously with supplying the gas flows 252, 262 in step 554, directing the main exhaust gas flow 356 in step 556, and directing the bypass exhaust gas flow 354 in step 558. Moreover, in some embodiments, adjusting a flow rate of the gas flows 252, 262 in step 564 may be performed simultaneously with applying the focused energy beam 52 in step 566 to actively adjust operation of the AM system 10 in real time based on feedback from the sensor 380. Additionally, present embodiments may generally alternate applying the powder material in step 552 and providing the gas flows 252, 262 in step 554, such that operation of the powder application device 44 is undisturbed by the gas flows 252, 262 within the chamber 32. In some embodiments, the process 550 may return to step 552 to continue performing the process 550 to form additional solidified layers on the previously formed solidified layer, as indicated by arrow 567.

The technical effects of the present disclosure include improving the operating costs, performance, and efficiency of an AM system by effectively removing particulates, such as smoke and/or particulate matter, generated during an AM process. The disclosed AM system utilizes a spacer flow guide disposed within a downstream portion of the chamber to partition a volume of the chamber into a smaller gas volume from which the particulates may be removed using a reduced flow rate or flow volume of gas. Moreover, in combination with a housing of the AM system, the spacer flow guide defines a main exhaust channel that fluidly couples a lower portion of the chamber to a gas outlet. Additionally, a bypass exhaust channel fluidly couples an upper portion of the chamber to a downstream portion of the main exhaust channel. As such, gas flows traversing the chamber are selectively split to flow around the spacer flow guide, forming laminar flow paths that may substantially reduce or eliminate gas entrainment and recirculation of the particulates inside the chamber.

This written description uses examples to disclose the present techniques, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An additive manufacturing (AM) system, comprising:
a housing defining a chamber, wherein a lower portion of the chamber comprises a build platform disposed therein that is configured to receive a powder material;
a gas inlet system coupled to a first side wall of the housing and configured to direct one or more gas flows through the chamber;
a gas outlet defined in a second side wall of the housing, disposed opposite the first side wall, wherein the gas outlet is configured to discharge the one or more gas flows from the chamber;
a spacer flow guide disposed within the chamber and configured to direct the one or more gas flows around the spacer flow guide;
a main exhaust channel defined between a first surface of the spacer flow guide and the housing, wherein the main exhaust channel is configured to direct a first portion of the one or more gas flows from the lower portion of the chamber into the gas outlet; and
a bypass exhaust channel defined between a second surface of the spacer flow guide and the housing, wherein the bypass exhaust channel is configured to direct a second portion of the one or more gas flows from an upper portion of the chamber to combine the first portion and the second portion of the one or more gas flows upstream of the gas outlet.

2. The AM system of claim 1, wherein the spacer flow guide comprises a third surface upstream of the first surface and the second surface, wherein the third surface is inclined at a guiding angle relative to the first side wall, and wherein the third surface is configured to direct at least part of the first portion of the one or more gas flows into the main exhaust channel.

3. The AM system of claim 2, wherein the guiding angle is between about 10 degrees and about 60 degrees.

4. The AM system of claim 2, comprising an energy generating system configured to apply a focused energy beam to the powder material received by the build platform, wherein the guiding angle is substantially parallel to a beam angle of the focused energy beam.

5. The AM system of claim 1, wherein the housing comprises:
a third side wall extending between a first edge of the first side wall and a first edge of the second side wall; and
a fourth side wall extending between a second edge of the first side wall and a second edge of the second side wall, wherein the bypass exhaust channel comprises a width defined between the first edge of the second side wall and the second edge of the second side wall.

6. The AM system of claim 1, wherein an upstream portion of the bypass exhaust channel comprises a tapered neck that narrows along a flow direction of the second portion of the one or more gas flows along the bypass exhaust channel.

7. The AM system of claim 1, comprising:
an interconnect exhaust channel extending through the spacer flow guide, wherein the interconnect exhaust channel is configured to direct a third portion of the one or more gas flows from an intermediate portion of the chamber and combine the third portion with the second portion of the one or more gas flows in the bypass exhaust channel, wherein the interconnect exhaust channel is positioned a vertical distance between the main exhaust channel and the bypass exhaust channel.

8. The AM system of claim 1, wherein the gas inlet system comprises:
an upper gas inlet defined in the first side wall of the housing, wherein the upper gas inlet is configured to direct an upper gas flow of the one or more gas flows through the chamber; and
a lower gas inlet defined in the first side wall, positioned a vertical distance below the upper gas inlet, wherein the lower gas inlet is configured to direct a lower gas flow of the one or more gas flows toward the build platform.

9. The AM system of claim 8, comprising one or more gas delivery devices coupled to the upper and lower gas inlets and configured to regulate one or more flow characteristics of the upper and lower gas flows, wherein the one or more gas delivery devices are configured to supply the upper and lower gas flows at a flow velocity ratio of the upper gas flow to the lower gas flow that is between about 3:1 and about 1:1, or about 2:1.

10. The AM system of claim 1, comprising a laser window formed within a top wall of the housing, wherein the top wall extends between an upper edge of the first side wall and an upper edge of the second side wall, wherein the laser window protrudes into the chamber from the top wall, such that part of the one or more gas flows impinge on the laser window and are directed into the bypass exhaust channel.

11. A method of operating an additive manufacturing (AM) system, comprising:
depositing a bed of a powder material on a build platform positioned within a lower portion of a chamber defined by a housing;
supplying one or more gas flows into the chamber;
directing a first portion of the one or more gas flows along a main exhaust channel defined between the housing and a lower surface of a spacer flow guide disposed within the chamber, wherein the main exhaust channel fluidly couples the lower portion of the chamber to a gas outlet; and
directing a second portion of the one or more gas flows along a bypass exhaust channel defined between the housing and an upper surface of the spacer flow guide, wherein the bypass exhaust channel fluidly couples an upper portion of the chamber to the main exhaust channel.

12. The method of claim 11, comprising:
receiving, via a control system of the AM system, feedback indicative of an operating parameter of the second portion of the one or more gas flows via a sensor fluidly coupled to the bypass exhaust channel;
determining, via the control system, whether the operating parameter is outside of an operating parameter threshold; and
in response to determining that the operating parameter is outside the operating parameter threshold, adjusting, via the control system, a flow rate of the one or more gas flows supplied into the chamber.

13. The method of claim 12, wherein the operating parameter comprises a flow rate of the second portion of the one or more gas flows and the operating parameter threshold comprises a flow rate threshold.

14. The method of claim 12, wherein the operating parameter comprises a particulate concentration of the second portion of the one or more gas flows and the operating parameter threshold comprises a particulate concentration threshold, and wherein the method comprises increasing the flow rate of the one or more gas flows in response to determining that the particulate concentration is above the particulate concentration threshold.

15. An additive manufacturing (AM) system, comprising:
a housing defining a chamber, wherein the chamber is configured to receive one or more gas flows therein;
a build platform disposed within a lower portion of the chamber and configured to receive a bed of powder material;
a gas outlet defined in a first side wall of the housing, wherein the gas outlet is configured to discharge the one or more gas flows from the chamber;
a spacer flow guide configured to direct a first portion of the one or more gas flows below the spacer flow guide and configured to direct a second portion of the one or more gas flows above the spacer flow guide;
a main exhaust channel defined between a lower surface of the spacer flow guide and the housing, wherein the main exhaust channel is configured to direct the first portion of the one or more gas flows into the gas outlet; and
a bypass exhaust channel defined between an upper surface of the spacer flow guide and the housing, wherein the bypass exhaust channel is configured to introduce the second portion of the one or more gas flows into the first portion of the one or more gas flows at an injection point positioned along a length of the main exhaust channel upstream of the gas outlet.

16. The AM system of claim 15, comprising an energy generating system disposed above the build platform and configured to generate and direct a focused energy beam onto at least a portion of the bed of powder material, wherein the energy generating system is configured to direct the focused energy beam onto the at least a portion of the bed of powder material within a beam angle defined relative to a vertical axis, and wherein a front surface of the spacer flow guide has an angle, relative to the vertical axis, that is substantially the same as the beam angle.

17. The AM system of claim 15, wherein the spacer flow guide is configured to direct the one or more gas flows to the main exhaust channel and the bypass exhaust channel with substantially no turbulence.

18. The AM system of claim 15, wherein the spacer flow guide comprises an insert disposed within the chamber, and wherein the spacer flow guide partitions an interior volume of the chamber into a spacer-occupied volume of the chamber and a gas volume of the chamber.

19. The AM system of claim 15, comprising a plurality of interconnect exhaust channels each extending through the spacer flow guide, wherein each interconnect exhaust channel is configured to direct a respective portion of the one or more gas flows from within the chamber and into the second portion of the one or more gas flows within the bypass exhaust channel.

20. The AM system of claim 15, comprising:
a sensor fluidly coupled to the bypass exhaust channel; and
a controller communicatively coupled to the sensor and to a gas inlet system that is configured to provide the one or more gas flows to the chamber, wherein the controller is configured to instruct the gas inlet system to adjust a flow rate of the one or more gas flows in response to receiving a signal from the sensor that is indicative of a particulate concentration beyond a particulate concentration threshold.

* * * * *